United States Patent [19]
Kushida et al.

[11] Patent Number: 5,040,418
[45] Date of Patent: Aug. 20, 1991

[54] ACCELERATION SENSOR

[75] Inventors: Takeo Kushida; Hideyasu Takefuta; Hajime Muramatsu, all of Higashimatsuyama, Japan

[73] Assignee: Diesel Kiki Co., Ltd., Tokyo, Japan

[21] Appl. No.: 573,869

[22] Filed: Aug. 28, 1990

Related U.S. Application Data

[63] Continuation of Ser. No. 375,886, Jul. 6, 1989, abandoned.

[30] Foreign Application Priority Data

Jul. 28, 1988 [JP] Japan .................. 63-99151

[51] Int. Cl.⁵ .............................. G01P 15/11
[52] U.S. Cl. .................. 73/517 R; 73/654
[58] Field of Search ............ 73/516 R, 517 R, 517 B, 73/654

[56] References Cited

U.S. PATENT DOCUMENTS

| | | | |
|---|---|---|---|
| 2,923,904 | 2/1960 | Heiber | 336/30 |
| 3,129,347 | 4/1964 | Tognola | 310/15 |
| 4,754,644 | 7/1988 | Valentini | 73/517 R |
| 4,843,877 | 7/1989 | Kushida et al. | 73/517 R |
| 4,901,569 | 2/1990 | Lui | 73/517 R |

FOREIGN PATENT DOCUMENTS 3418983 11/1985 Fed. Rep. of Germany .
63-144261 6/1988 Japan .

Primary Examiner—John E. Chapman

[57] ABSTRACT

An acceleration sensor includes a body supporting a casing within which a magnetic member is received. A plurality of magnets are mounted on the body and disposed around the casing. The magnetic forces of the magnets hold the magnetic member in a reference position within the casing. The magnetic member is displaceable from the reference position against the magnetic forces of the magnets when the acceleration sensor is subjected to acceleration. A detection device is mounted externally of the casing so as to detect displacement of the magnetic member from the reference position. The acceleration sensor further includes a position adjusting device for adjusting the position of at least one of the magnets relative to the casing so as to set the intensities of the magnetic fields of the magnets in predetermined relation within the casing.

7 Claims, 2 Drawing Sheets

ACCELERATION SENSOR

This application is a continuation of U.S. application Ser. No. 07/375,886, filed July 6, 1989, now abandoned.

BACKGROUND OF THE INVENTION

1. Field of the Invention

This invention relates to a sensor for detecting acceleration.

2. Prior Art

Japanese Laid-Open (Kokai) Patent Application No. 109374/88, filed by the Applicant of this application, discloses an acceleration sensor which comprises a tubular casing, a magnetic member in the form of an iron ball received within the casing, a differential transformer (detection member) mounted externally of the casing, and a ring-shaped permanent magnet disposed externally of the differential transformer to attract the iron ball to a central portion of the differential transformer. The casing, the differential transformer and the permanent magnet are mounted within a body immovably relative to the body. The sensor is mounted on an object to be sensed in such a manner that the axis of the casing coincides with the sensing direction.

In the above conventional acceleration sensor, particularly, the relation between the magnetic force of the permanent magnet and the position of the casing, as well as the relation between the magnetic force of the permanent magnet and the position of the differential transformer, is important. However intended functions have not always been achieved due to manufacturing errors of the component parts and an error in magnetization of the permanent magnet.

Japanese Laid-Open Patent Application No. 144261/88 and Japanese Laid-Open Utility Model Application Nos. 97862/88 and 109654/88, filed by the Applicant of this application, also disclose acceleration sensors employing a tubular casing, an iron ball, a permanent magnet and a differential transformer. Based on the above four earlier Japanese applications and other applications, a U. S. patent application was filed on Oct. 23, 1987 under Ser. No. 113,180.

U.S. Pat. Nos. 2,979,959, 4,311,051 and 4,365,513 describe acceleration sensors using an iron ball.

Japanese Laid-Open Patent Application No. 62870/86 discloses a two-dimensional acceleration sensor comprising a pair of permanent magnets disposed respectively on opposite sides of a disc-shaped casing.

Further, U.S. Pat. Nos. 3,100,292 and 4,047,439 and Japanese Laid-Open Patent Application Nos. 203861/85, 233564/85 and 252271/85 disclose acceleration sensors.

However, none of the above-mentioned prior art publications disclose means for adjusting the relative position between the permanent magnet and the casing and the relative position between the permanent magnet and the differential transformer.

SUMMARY OF THE INVENTION

It is therefore an object of this invention to provide an acceleration sensor which achieves intended functions without fail.

According to the present invention, there is provided an acceleration sensor comprising:

(a) a body;
(b) a casing supported on the body;
(c) a magnetic member received within the casing;
(d) a plurality of magnets supported on the body and disposed around the casing, magnetic forces of the magnets holding the magnetic member in a reference position within the casing, and the magnetic member being displaceable from the reference position against the magnetic forces of the magnets when the acceleration sensor is subjected to acceleration;
(e) detection means mounted externally of the casing so as to detect displacement of the magnetic member from the reference position; and
(f) means for adjusting the position of at least one of the magnets relative to the casing.

DESCRIPTION OF THE PREFERRED EMBODIMENT OF THE INVENTION

A preferred embodiment of the invention will now be described with reference to the drawings.

Figure 1:
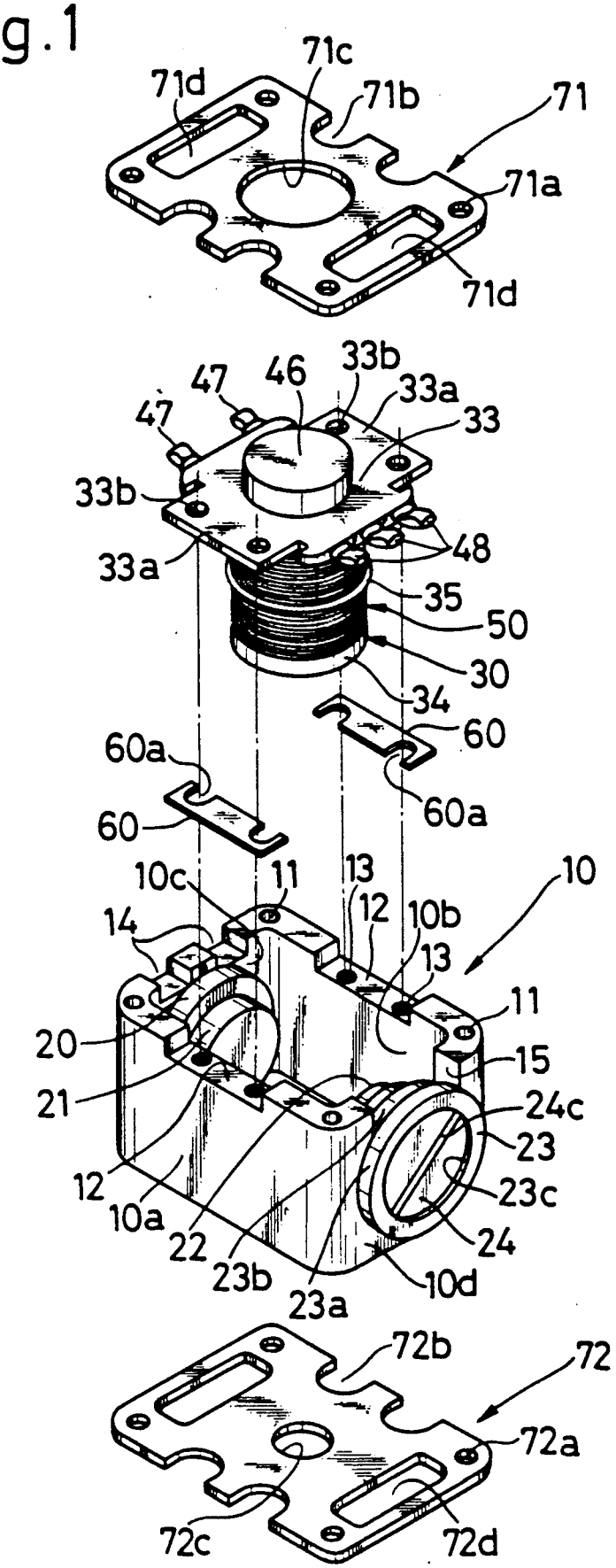
FIG. 1 is an exploded perspective view of an acceleration sensor provided in accordance with the present invention.
Figure 2:
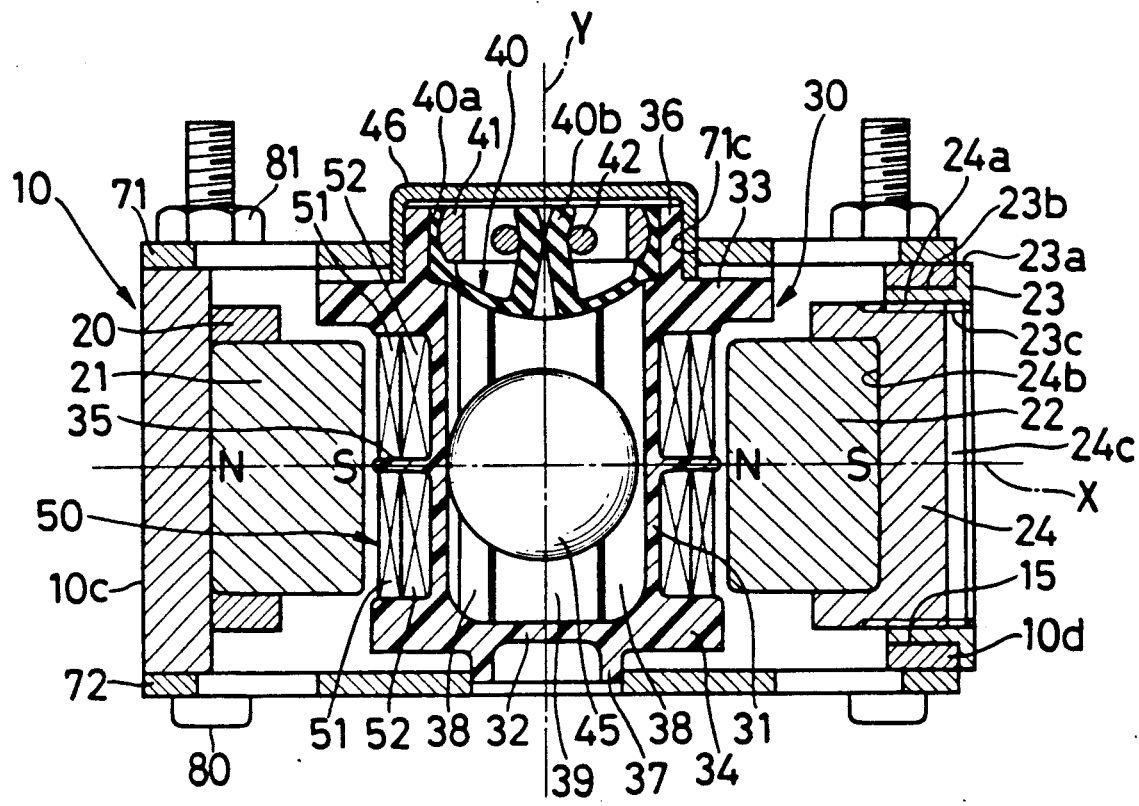
FIGS. 2 and 3 are respectively cross-sectional views taken along lines perpendicularly intersecting each other.
Figure 3:
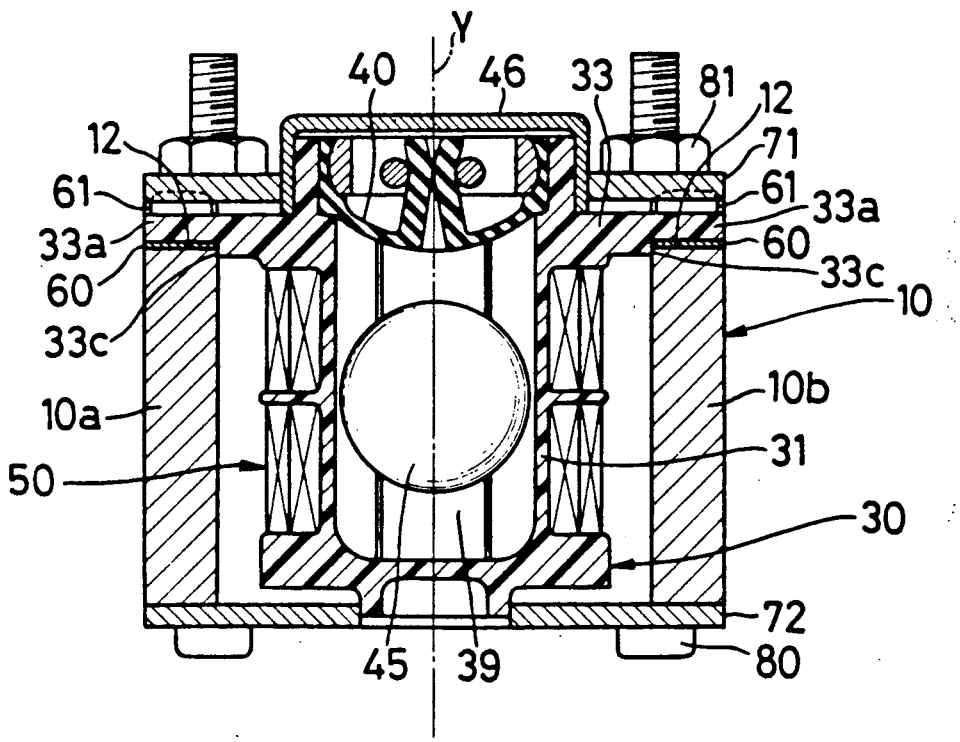

An acceleration sensor shown in FIGS. 1 to 3 broadly comprises a body 10, a pair of permanent magnets 21 and 22 supported on the body 10 in opposed relation to each other, a casing 30 received in the body 10, a differential transformer 50 mounted on the casing 30 and serving as a detection means, a magnetic member 45 in the form of an iron ball received within the casing 30, and a pair of covers 71 and 72 fixedly secured respectively to the upper and lower ends of the body 10.

As shown in FIG. 1, the body 10 has a tubular shape and a rectangular cross-section, the body 10 having a pair of parallel opposed side walls 10a and 10b and another pair of parallel opposed side walls 10c and 10d disposed perpendicular to the side walls 10a and 10b. A hole 11 is formed through each of the four corner portions of the body 10 where the side walls 10a and 10b intersect the side walls 10c and 10d, the hole 11 extending between the upper and lower ends of the body 10. Recesses 12 and 12 are formed in the upper ends or edges of the side walls 10a and 10b, respectively, and two screw holes 13 and 13 are formed in the bottom of each of the two recesses 12 and 12 and are spaced from each other along the side wall 10a (10b). Two recesses 14 and 14 are formed in the upper end or edge of the side wall 10c and are spaced from each other along the side wall 10c. A U-shaped notch 15 is formed in the side wall 10d, the notch 15 opening to the upper end or edge of the side wall 10d.

As shown in FIGS. 1 and 2, a ring-shaped support member 20 is fixedly secured to the inner surface of the side wall 10c of the body 10, and the permanent magnet 21 is partially received fixedly in a recess defined by the side wall 10c and the support member 20. The permanent magnet 21 is of a cylindrical shape, and projects toward the center of the body 10 in such a manner that the axis or center line of the magnet 21 is disposed perpendicular to the side wall 10c and is disposed centrally of the height of the body 10.

As shown in FIGS. 1 and 2, the other permanent magnet 22 is supported on the side wall 10d of the body 10. More specifically, a ring 23 constituting part of the body 10 is fixedly secured to the side wall 10d. The ring 23 has an annular base portion 23b and a peripheral flange 23a formed on the outer periphery of the base portion 23b at one end of the base portion 23b. The ring 23 is fixedly mounted on the body 10 in such a manner that the base portion 23b is snugly fitted in a lower portion of the notch 15, with the flange 23a held against the outer surface of the side wall 10d. Internal threads 23c are formed on the inner peripheral surface of the base portion 23b of the ring 23, and a support member 24 having external threads 24 on its outer peripheral surface is threaded into the annular base 23b, with the external threads 24 threadedly engaging the internal threads 23c. A recess 24b is formed in the inner face or side of the support member 24, and the permanent magnet 22 which is equal in shape and size to the permanent magnet 21 is fixedly fitted in the recess 24b. The permanent magnet 22 is disposed coaxially with the permanent magnet 21, and the common axis of the two permanent magnets 21 and 22 is hereinafter referred to as "X-axis". A groove 24c is formed in the outer face of the support member 24, and by engaging a screw driver in the groove 24c and rotating the screw driver, the support member 24 is moved along the X-axis together with the permanent magnet 22, thus adjusting the position of the permanent magnet 22.

Each of the permanent magnets 21 and 22 is magnetized in the direction of its axis, that is, in the direction of the X-axis, and the opposed end portions of the two magnets are of opposite polarity, as shown in FIG. 2.

As shown in FIGS. 1 to 3, the casing 30 is made of a suitable resin, and has a hollow cylindrical portion 31, an end wall 32 closing the lower end of the cylindrical portion 31, first and second flanges 33 and 34 formed on the outer periphery of the cylindrical portion 31 at its upper and lower ends, respectively, a third flange 35 formed on the outer periphery of the cylindrical portion 31 intermediate the first and second flanges 33 and 34, an annular portion 36 extending upwardly from the upper end of the cylindrical portion 31 in coaxial relation thereto and being greater in diameter than the cylindrical portion 31, and an annular portion 37 extending downwardly from the end wall 32 in coaxial relation to the cylindrical portion 31. A plurality of grooves 38 are formed in the inner peripheral surface of the cylindrical portion 31 and extend in the axial direction of the casing 30. The grooves 38 serve as passages for a damper liquid later described.

The upper open end of the cylindrical portion 31 of the casing 30 is closed by a lid 40 of rubber. The lid 40 has an outer tubular portion 40a and an inner tubular portion 40b. A ring 41 is fitted in the outer tubular portion 40a to press it against the inner periphery of the annular portion 36, thereby fixing the outer tubular portion 40a relative to the annular portion 36. Also, the inner tubular portion 40b is closed by a ring 42 fitted thereon. With this arrangement, a sealed space 39, which is defined by the cylindrical portion 31, the end wall 32 and the lid 40, is provided within the casing 30. The iron ball 45, having a diameter slightly smaller than the inner diameter of the cylindrical portion 31, is received within the sealed space 39, and the damper liquid is filled in the sealed space 39. Although the gap or spacing between the the iron ball 45 and the inner peripheral surface of the casing 30 is actually very small, this gap is shown in FIGS. 2 and 3 in an exaggerated manner for illustration purposes. A cap 46 is fitted on the annular portion 36 of the casing 30.

The casing 30 is disposed between the two permanent magnets 21 and 22 and is supported by the body 10. More specifically, as shown in FIGS. 1 and 3, the first flange 33 of the casing 30 has a pair of opposite extensions 33a and 33a extending from its central base portion radially of the cylindrical portion 31. Each extension 33a has two holes 33b and 33b formed therethrough. The lower surface of the extension 33a is stepped to provide a shoulder 33c. The extensions 33a and 33a of the first flange 33 rest respectively on the bottoms of the recesses 12 and 12 in the body 10 through adjustment shims 60 and 60. The lengths of the extension 33a and the recess 12 in the direction of the X-axis are equal to each other, and therefore the positioning of the casing 30 relative to the body 10 in the direction of the X-axis is effected upon engagement of each extension 33a in the recess 12. Also, the shoulders 33c and 33c of the extensions 33a and 33a are held against the inner surfaces of the side walls 10a and 10b of the body 10, respectively, to position the casing 30 in a direction perpendicular to the X-axis. As a result, the axis or center line of the casing 30 substantially coincides with the axis or center line of the body 10. The axis of the casing 30 as well as the axis of the body 10 is indicated by "Y-axis" in FIGS. 2 and 3. The two shims 60 and 60 have the same thickness and each have two notches 60a formed in the inner edge thereof. Screws 61 extend respectively through the holes 33b, formed through the extensions 33a of the first flange 33, and the notches 60a in the adjustment shims 60 and are threaded respectively into the screw holes 13 in the body 10.

As shown in FIG. 1, two terminals 47 and three terminals 48 are respectively formed on and extend outwardly from the opposite edges of the first flange 33 of the casing 30 disposed adjacent to the extensions 33a. The two terminals 47 are partially received respectively in the two recesses 14 formed in the body 10. The three terminals 48 are partially received in the notch 15 formed in the body 10.

The differential transformer 50 is mounted around the cylindrical portion 31 of the casing 30. More specifically, a secondary coil 52 is wound around that portion of the cylindrical portion 31 extending between the third flange 35 and the first flange 33, and a primary coil 51 is wound around the secondary coil 52. Similarly, an inner secondary coil 52 and an outer primary coil 51 are wound around that portion of the cylindrical portion 31 extending between the third flange 35 and the second flange 34. The two primary coils 51 and 51 are composed of a continuous single electric wire, and the opposite ends of this electric wire are connected to an oscillator (not shown) through the terminals 47 and 47. One ends of the secondary coils 52 and 52 are connected together in a differential fashion through the central one of the terminals 48 whereas the other ends of the secondary coils are connected to a detection circuit (not shown) through the other two terminals 48.

The center of the differential transformer 50 in the direction of the Y-axis is at substantially the same level as the X-axis.

As shown in FIG. 1, a hole 71a is formed through each of the four corners of the cover 71, and similarly a hole 72a is formed through each of the four corners of the cover 72. The covers 71 and 72 are fixedly secured to the body 10 by bolts 80, passing through the holes 72a, the holes 11 (formed through the body 10) and the holes 71a, and nuts 81 threaded respectively on the bolts 80 (see FIG. 3). Notches 71b are formed in the opposed edges of the cover 71 extending in the X-axis direction, and similarly notches 72b are formed in the opposed edges of the cover 72 extending in the X-axis direction. The notches 71b receive the heads of the screws 61, respectively. The covers 71 and 72 have respective circular central holes 71c and 72c formed therethrough. The cap 46 for the casing 30 is received in the circular hole 71c of the upper cover 71, and the annular portion 37 of the casing 30 is received in the circular hole 72c of the lower cover 72. A pair of rectangular holes 71d are formed through the upper cover 71 and disposed respectively on the opposite sides of the circular hole 71c in the X-axis direction. Similarly, a pair of rectangular holes 72d are formed through the lower cover 72 and disposed respectively on the opposite sides of the circular hole 72c in the X-axis direction. The electric wires connected to the terminals 47 and 48 pass through the rectangular holes 71d of the upper cover 71 and are led to the oscillator and the detection circuit.

The support members 20 and 24 respectively supporting the pair of permanent magnets 21 and 22, the ring 23, the body 10 and the covers 71 and 72 are made of iron, and jointly constitute a magnetic circuit for the permanent magnets 21 and 22. This magnetic circuit is substantially symmetrical with respect to a horizontal plane in which the X-axis lies, and is also substantially symmetrical with respect to a vertical plane disposed perpendicular to the sheet of FIG. 2 and including the Y-axis therein. Magnetic lines of force are produced between the two permanent magnets 21 and 22 and pass through the iron ball 45.

The acceleration sensor of the above construction is mounted on an object to be sensed in such a manner that the axis (i.e., the Y-axis) of the casing 30 extends in the sensing direction.

A high-frequency AC voltage is applied from the above-mentioned oscillator to the primary coils 51 and 51 of the differential transformer 50, so that a high-frequency AC voltage, produced in the secondary coils 52 and 52 as a differential output, is fed to the detection circuit. In the detection circuit, the differential output is subjected to synchronous rectification, and the high-frequency components are removed from the differential output, and a DC voltage of a predetermined level (i.e., a reference voltage) is applied to the differential output to thereby produce a detection output. This detection output contains information indicative of whether the detection output represents acceleration or deceleration and also contains information indicative of the level of such acceleration or deceleration.

When the acceleration sensor is subjected to no acceleration (that is, the sensor is in a stationary condition or in uniform motion), the iron ball 45 is held stationary under the attracting forces of the permanent magnets 21 and 22. This stationary position is hereinafter referred to as "reference position". In the reference position, the amplitude of the differential output from the differential transformer 50 is ideally zero, and the detection output is equal to the reference voltage.

When the acceleration sensor is in accelerating motion or decelerating motion in the direction of the Y-axis, the iron ball 45 is subjected to an inertia force in a direction opposite to the acceleration direction or the deceleration direction, so that the iron ball 45 is moved in the Y-axis direction until the inertia force balances the forces exerted by the permanent magnets 21 and 22 on the iron ball 45 in the Y-axis direction. The differential transformer 50 feeds a differential output of an amplitude corresponding to the amount of displacement of the iron ball 45 from its reference position in the Y-axis direction, and in accordance with this differential output, the detection circuit produces a detection voltage deviated from the reference voltage.

Even when the acceleration is zero as described above, the detection voltage actually varies slightly from the reference voltage, that is, above or below the reference voltage. The reason why the detection voltage is subjected to such variation will now be described. The diameter of the iron ball 45 is slightly smaller than the inner diameter of the casing 30, and therefore the iron ball 45 is disposed in point contact with the inner surface of the casing 30. The iron ball 45 undergoes oppositely-directed radial forces exerted respectively by the permanent magnets 21 and 22, and is held in contact with one of two those portions of the inner peripheral surface of the casing 30 disposed close to the permanent magnets 21 and 22, respectively. The force (i.e., contact force) under which the iron ball 45 is held against the inner surface of the casing 30 is determined by a difference between the above radial forces exerted respectively by the permanent magnets 21 and 22. The iron ball 45 is subjected to a frictional resistance force (in the axial direction of the casing 30) determined by the product of the above contact force and the friction coefficient of the inner surface of the casing 30. Therefore, even when the acceleration is zero, the iron ball 45 is caused to stop at a position where the forces exerted by the permanent magnets 21 and 22 in the axial direction of the casing 30 balances the frictional resistance force. Thus, the iron ball 45 does not return to the reference position where the value of the differential transformer is substantially zero, and the iron ball 45 is displaced slightly from the reference position within a certain range. As a result, the amplitude of the differential output of the differential transformer 50 fails to be accurately zero.

In order to keep variations in the detection output (which variations occur when the acceleration is zero as described above) to within an acceptable range, it is necessary that regardless of the position of contact of the iron ball 45 with the inner surface of the casing 30, the contact force, i.e., a difference between the magnetic forces of the permanent magnets 21 and 22 acting radially of the iron ball 45, should be as small as possible to thereby reduce the frictional resistance force acting on the iron ball 45.

To achieve this, the following requirements must be met. Namely, a first requirement is that the intensities of the magnetic fields produced respectively by the permanent magnets 21 and 22 are equal to each other in the Y-axis (i.e., the axis or center line of the casing 30). A second requirement is that a difference between the diameter of the iron ball 45 and the inner diameter of the casing 30 should be as small as possible.

When the first requirement is met, the force of contact of the iron ball 45 with that portion of the inner surface of the casing 30 disposed close to the permanent magnet 21 is equal to the force of contact of the iron ball 45 with that portion of the inner surface of the casing 30 disposed close to the other permanent magnet 22. When the first and second requirements are met, the forces, exerted respectively by the permanent magnets 21 and 22 on the iron ball 45 in its radial directions, mostly cancel each other regardless of whether the iron ball 45 is held in contact with one or the other of the above-mentioned two portions of the inner surfaces of the casing 30 disposed close to the permanent magnets 21 and 22, respectively. As a result, the iron ball 45 is subjected to a small contact force, so that the frictional resistance is reduced, thereby keeping, to within a small range, a variation in the amount of displacement of the iron ball 45 from the reference position when the acceleration is zero.

The second requirement can be met relatively easily. With the conventional acceleration sensors, although the first requirement is met at the stage of design, this can not actually be easily done due to manufacturing errors of the component parts and errors in the magnetic forces of the permanent magnets 21 and 22. In this embodiment, however, the first requirement can be easily met by rotating the support member 24 to finely move the same in the direction of the X-axis to thereby adjust the position of the permanent magnet 22 in the same direction.

The position adjustment of the permanent magnet 22 will now be described in detail. First, after the acceleration sensor is shook with the hand or is subjected to vibration, the acceleration sensor is allowed to be stationary, and then either the amplitude of the differential output of the differential transformer 50 or the amount of displacement of the detection output from the reference voltage is observed. Then, the position of the permanent magnet 22 in the direction of the X-axis is adjusted. This procedure is repeated until the position of the permanent magnet 22 is so adjusted as to reduce the above displacement amount to a minimum.

After effecting the above position adjustment, an adhesive or the like may be applied to the marginal portion of the outer surface of the support member 24 and that portion of the internally-threaded portion 23c of the ring 23 disposed adjacent to the above marginal portion, so as to prohibit the support member 24 from rotation.

In this embodiment, also, by adjusting the thickness of the adjustment shims 60 and 60, the position of the casing 30 is adjusted in the direction of the Y-axis so that the magnetic center of the differential transformer 50 can coincide with the reference position of the iron ball 45 determined by the permanent magnets 21 and 22. Referring to the term "the magnetic center of the differential transformer 50", when the iron ball 45 is positioned at this magnetic center, the differential output is theoretically zero. With this arrangement, the relation between the acceleration and the detection output is constant.

The manner of adjusting the position of the casing 30 will now be described in detail. There are provided shims 60 of various thicknesses. Among these, shims 60 and 60 of a certain thickness are selected, and the casing 30 is fixedly secured to the body 10 by the screws 61 through the thus selected shims 60 and 60. In this condition, the acceleration sensor is shook and then is allowed to be stationary, and then either the amplitude of the differential output of the differential transformer 50 or the amount of displacement of the detection output from the reference voltage is detected. This procedure is repeated until the shims 60 and 60 of the optimum thickness are selected in order to reduce the above displacement amount to a minimum. Since the adjustment shims 60 and 60 have the notches 60a, the shims can be easily exchanged merely by loosening the screws 61, and therefore this adjustment can be carried out efficiently.

There are occasions when the magnetic center line of the permanent magnets 21 and 22 is out of alignment with its geometric axis. In such a case, when the permanent magnet 22 is rotated to be moved in the X-axis direction to effect its position adjustment, the magnetic center line of the permanent magnets 21 and 22 is displaced in the direction of the Y-axis, so that the reference position of the iron ball 45 is displaced in the direction of the Y-axis. Therefore, it is preferred that the position adjustment of the casing 30 in the direction of the Y-axis should be carried out after the position adjustment of the permanent magnet 22, because this ensures that the reference position of the iron ball 45 can be positively caused to coincide with the magnetic center of the differential transformer 50.

In the case where the axis or center line of the casing 30 is disposed vertically, the reference position of the iron ball 45 is displaced slightly below the position at which the iron ball 45 would be located by the attracting forces of the permanent magnets 21 and 22 unless the iron ball 45 is not subjected to the influence of gravity. This displacement of the iron ball 45 due to gravity can be compensated for by the position adjustment of the casing 30. Therefore, regardless of whether the axis of the casing 30 is disposed vertically or horizontally, variations in the detection output can be eliminated.

According to a modified form of the invention, by adjusting the position of the permanent magnet 22 in the direction of the X-axis, the intensities of the magnetic fields of the permanent magnets 21 and 22 may be different from each other by a predetermined amount at the axis or center line of the casing 30. With this arrangement, the iron ball 45 is always held against that portion of the inner surface of the casing 30 which is disposed close to that permanent magnet having a greater magnetic force at the axis of the casing 30, thereby stabilizing the iron ball 45. In such a case, it is preferred that the difference between the intensities of the magnetic fields of the permanent magnets 21 and 22 at the axis or centerline of the casing 30 should be so small that the force exerted by one of the two permanent magnets 21 and 22 on the iron ball 45 in one radial direction of the iron ball 45 can cancel, as much as possible, the force exerted by the other permanent magnet on the iron ball 45 in the opposite radial direction of the iron ball 45.

While the acceleration sensor according to the present invention has been specifically shown and described herein, the invention itself is not to be restricted to the exact showing of the drawings or the description thereof, and various modifications can be made.

For example, the positions of the pair of permanent magnets disposed respectively on the opposite sides of the iron ball can be both adjusted. Also, two pairs of permanent magnets can be disposed around the iron ball and be circumferentially spaced from one another at an angle of 90 degrees.

A threaded rod portion may be integrally formed on the support member for adjusting the position of the permanent magnet, in which case the threaded rod portion is threaded into the internally threaded portion of the body so as to be suitably rotated to effect the position adjustment of the permanent magnet, and thereafter the rotation of the support member is prohibited by tightening a lock nut threaded on the threaded rod portion.

The magnetic member may be in the form of a rigid cylindrical member of a magnetic material or in the form of a magnetic fluid comprising a colloid-like liquid having particles of a ferromagnetic material dispersed in a solvent.

Instead of the transformer, the detection means may comprise capacitors each mounted on the outside of the casing and having a pair of electrode plates. In this case, the displacement of the magnetic member is detected in terms of a variation in electric capacity.

The permanent magnets may be replaced by electromagnets. In this case, the detection output of the detection means may be fed back to a control circuit which functions to control the supply voltage of the electromagnets, thereby controlling the supply voltage of the electromagnets so that the magnetic member is always located in the reference position. Since the acceleration corresponds to this supply voltage, the acceleration is determined by the supply voltage.

The above sensors can be used as sensors for detecting the inclination of an object.

What is claimed is:

1. An acceleration sensor comprising:
   (a) a body;
   (b) a tubular casing having an axis, only one end portion of said tubular casing being fixed to said body;
   (c) a magnetic member received within said casing so as to be movable along the axis of said body;
   (d) magnet means for holding said magnetic member in a reference position within said casing, said magnet means being disposed radially externally of said casing and being supported on said body in such a manner that said magnet means is immovable with respect to said body in the axial direction of said casing, said magnetic member being displaceable from said reference position along the axis of said casing when said acceleration sensor is subjected to acceleration; and
   (e) detection means mounted on an outer periphery of said casing for detecting displacement of said magnetic member from said reference position.

2. An acceleration sensor according to claim 1, in which said casing has a radially outwardly directed flange which is formed at said one end portion and is fixed to said body to support said casing.

3. An acceleration sensor according to claim 2, in which said body has an elongated shape and said flange is fixed to an end of said body so that said casing is disposed within said body.

4. An acceleration sensor according to claim 3, in which said body has a pair of parallel opposed side walls and said flange has opposed end portions fixed to corresponding end faces of said side walls of said body so that said casing is disposed between said side walls.

5. An acceleration sensor according to claim 2, in which said detection means comprises a differential transformer mounted on said casing, and further comprising position adjusting means for adjusting the positions of said casing and said differential transformer with respect to said body and said magnet means in the axial direction of said casing.

6. An acceleration sensor, comprising:
   (a) a body;
   (b) a tubular casing having an axis, only one end portion of said tubular casing being fixed to said body, said casing having a radially outwardly directed flange formed at said one end portion and fixed to said body to support said casing;
   (c) a magnetic member received within said casing so as to be movable along the axis of said body;
   (d) magnet means for holding said magnetic member in a reference position within said casing, said magnet means being disposed radially externally of said casing and being supported on said body in such a manner that said magnet means is immovable with respect to said body in the axial direction of said casing, said magnetic member being displaceable from said reference position along the axis of said casing when said acceleration sensor is subjected to acceleration; and
   (e) detection means mounted on an outer periphery of said casing for detecting displacement of said magnetic member from said reference position, said detection means comprising a differential transformer mounted on said casing, and further comprising position adjusting means for adjusting the positions of said casing and said differential transformer with respect to said body and said magnet means in the axial direction of said casing, in which said position adjusting means comprises a shim interposed between said flange and said body.

7. An acceleration sensor according to claim 6, in which said flange is fixed to said body by screws and said shim has notches formed in an edge thereof to receive said screws.

* * * * *